United States Patent
Yamamoto

(10) Patent No.: US 7,741,814 B2
(45) Date of Patent: Jun. 22, 2010

(54) POWER SUPPLY DEVICE

(75) Inventor: Hiroyoshi Yamamoto, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 167 days.

(21) Appl. No.: 11/896,583

(22) Filed: Sep. 4, 2007

(65) Prior Publication Data
US 2008/0061741 A1    Mar. 13, 2008

(30) Foreign Application Priority Data
Sep. 7, 2006    (JP) .............................. 2006-243330

(51) Int. Cl.
*H02J 7/00* (2006.01)
*H02J 7/16* (2006.01)
*H02J 7/04* (2006.01)

(52) U.S. Cl. ...................... 320/134; 320/116; 320/132; 320/152; 320/162

(58) Field of Classification Search ................ 324/433, 324/434, 428; 320/118, 119, 127, 128, 132, 320/134, 136, 137, 148, 149, 152, 158, 159, 320/162–164, 116
See application file for complete search history.

(56) References Cited

U.S. PATENT DOCUMENTS
7,068,012 B1 * 6/2006 Geren et al. ................ 320/134

2005/0073282 A1 * 4/2005 Carrier et al. ............... 320/106

FOREIGN PATENT DOCUMENTS
JP    2003-282159    * 10/2003

* cited by examiner

*Primary Examiner*—Edward Tso
*Assistant Examiner*—Ahmed Omar
(74) *Attorney, Agent, or Firm*—Wenderoth, Lind & Ponack, L.L.P.

(57) ABSTRACT

A power supply device includes battery equipment and voltage detecting circuitry. The battery equipment includes positive-side and negative-side battery blocks that are connected to each other at a reference midpoint. The voltage detecting circuitry detects the respective voltage values of serially-connected battery modules of the battery equipment. The voltage detecting circuitry includes positive-side and negative side voltage management ICs with respect to the reference midpoint. The positive-side and negative side voltage management ICs manage the voltage conditions of the battery modules in the positive-side and negative-side battery blocks, respectively. Positive-side and negative-side voltage power lines of each of the positive-side and negative side voltage management ICs are connected to positive-side and negative-side output terminals of the battery equipment so that all the battery modules supply electric power to each of the voltage management ICs. The voltage management ICs have a common ground line.

15 Claims, 2 Drawing Sheets

POWER SUPPLY DEVICE

BACKGROUND OF THE INVENTION

1. Field of the Invention

The present invention relates to a power supply device such as a power supply for power tools and a backup power supply, and in particular to a power supply device that includes multiple battery modules that are serially connected to each other.

2. Description of the Related Art

Power supply devices such as a power supply for power tools and a backup power supply include multiple battery modules that are serially connected to each other in order to increase the output of the power supply devices. Thus, the power supply devices have high output. The reason is that the output of the power supply devices is proportional to the product of voltage and current of the battery modules. For example, in the case of a power tools that includes multiple battery modules that are serially connected to each other, the maximum output voltage is increased to 42 V, and in the case of a backup power supply that includes multiple batteries that are serially connected to each other, the maximum output voltage is increased to 57 V. In the case of nickel metal hydride battery power supply devices, the device includes battery modules each of which includes a plurality of nickel metal hydride batteries that are serially connected to each other. The battery modules are serially connected to each other. Thus, the nickel metal hydride battery power supply devices have high output. In the case of lithium-ion rechargeable battery power supply device, the device includes lithium-ion rechargeable batteries each of which serves as a battery module. A number of the lithium-ion rechargeable batteries as the battery modules are serially connected to each other. Thus, the lithium-ion rechargeable battery power supply devices have high output.

In power supply devices that include multiple battery modules that are serially connected to each other, the devices include a plurality of battery blocks. Battery modules are allocated to the plurality of battery blocks. The plurality of battery blocks are serially connected to each other at reference midpoints. In power supply devices that include multiple battery modules that are serially connected to each other, the devices detect the respective voltage values of the battery modules, and control charging/discharging operation. The reason is to prevent each serially-connected battery module from being overcharged and over-discharged. The electrical characteristics of batteries are likely to remarkably deteriorate if the batteries are overcharged and over-discharged. To prevent this adverse effect, a power supply device has been developed which includes circuitry that detects the respective voltage values of battery modules (see Japanese Patent Laid-Open Patent Publication No. 2003-282159). In the power supply device, battery modules that compose battery blocks are allocated to the battery modules.

SUMMARY OF THE INVENTION

FIG. 1 shows the power supply device in Japanese Laid-Open Patent Publication No. 2003-282159. In the power supply device, voltage management ICs 94 are connected to battery modules 92 of two battery blocks 91A and 91B, and detect the respective voltage values of the battery modules. One of the voltage management ICs 94 is a positive-side voltage management IC 94A with respect to a reference midpoint 95. The other of the voltage management ICs 94 is a negative-side voltage management IC 94B with respect to the reference midpoint 95. The positive-side voltage management IC 94A detects the respective voltage values of the battery modules 92 that are connected on the positive side with respect to the reference midpoint 95. The negative-side voltage management IC 94B detects the respective voltage values of the battery modules 92 that are connected on the negative side with respect to the reference midpoint 95. The voltage management ICs 94 are supplied with electric power from the battery blocks 91A and 91B, and thus operate. Accordingly, the positive-side voltage management IC 94A is supplied with electric power from the battery block 91A that is connected on the positive side with respect to the reference midpoint 95. The negative-side voltage management IC 94B is supplied with electric power from the battery block 91B that is connected on the negative side. The positive-side and negative-side voltage management ICs 94 cannot have completely the same power consumption. The reason is that there is unevenness in production processes and the like. The difference of the consumption current between the voltage management ICs 94 causes the difference between the discharging amounts of the positive-side and negative-side battery blocks 91A and 91B. The discharging amount difference is accumulated as time elapses. This accumulated discharging amount difference looses the balance of the remaining capacity amounts of the positive-side and negative-side battery blocks 91A and 91B. If the battery blocks that get out of balance in remaining capacity are serially connected to each other, and are charged/discharged, the battery block with smaller remaining capacity is more likely over-discharged, and the battery block with larger remaining capacity is more likely over-charged. In the case where both the battery blocks are charged/discharged to be prevented from being over-charged and over-discharged, the actual charging/discharging capacity becomes small. The reason is that the charging capacity is limited by the battery block with smaller remaining capacity, and the discharging capacity is limited by the battery block with larger remaining capacity.

In the power supply device shown in FIG. 1, the difference between the consumption current amounts of the positive-side and negative-side battery blocks 91A and 91B is also generated by signal transmission circuits 97 that shift the levels of signals that are provided from the positive-side and negative-side voltage management ICs 94. This difference looses the balance of the remaining capacity amounts of the positive-side and negative-side battery blocks 91A and 91B. The reason is that while the signal transmission circuit 97 of the positive-side voltage management IC 94A supplies electric power from both the battery blocks 91A and 91B, the signal transmission circuit 97 of the negative-side voltage management IC 94B supplies electric power only from the negative-side battery block 91B. To prevent this adverse effect, although it is conceivable that light emitting and receptive element equipment such as a photocoupler is used to keep the balance between the transmission portions, there are demerits in transmission rate, consumption current, and cost.

Consequently, the power supply device shown in FIG. 1 has a disadvantage in that the balance of the remaining capacity amounts of the two battery blocks 91A and 91B is lost as time elapses. For example, in the case where the capacity of a battery module is 2000 mAh and the difference between the consumption current values of positive-side and negative-side voltage management ICs is 20 μA, the difference between the consumption current values is estimated approximately 175 mAh for one year, and the difference of the remaining capacity amounts of the battery blocks reaches approximately 8.8%.

The present invention has been developed for solving the disadvantage. It is an important object of the present invention is to provide a power supply device that detects the respective voltage values of serially-connected battery modules that compose two battery blocks by means of separate voltage management ICs but keeps the balance of the remaining capacity amounts of the two battery blocks to be able to increase actual battery charging/discharging capacity and elongate battery life.

To achieve the foregoing object, a power supply device according to the present invention is configured as follows.

The power supply device includes battery equipment and voltage detecting circuitry. The battery equipment includes positive-side and negative-side battery blocks each of which includes a plurality of battery modules that are serially connected to each other. The positive-side and negative-side battery blocks are serially connected to each other at a reference midpoint. The voltage detecting circuitry detects the respective voltage values of the battery modules. The voltage detecting circuitry includes positive-side and negative side voltage management ICs with respect to the reference midpoint. The positive-side and negative side voltage management ICs manage the voltage conditions of the serially-connected battery modules in the positive-side and negative-side battery blocks, respectively. Positive-side and negative-side voltage power lines of each of the positive-side and negative side voltage management ICs are connected to positive-side and negative-side output terminals of the battery equipment so that all the battery modules supply electric power to each of the voltage management ICs, and the voltage management ICs have a common ground line.

In the aforementioned power supply device detects the respective voltage values of the battery modules that compose the two battery blocks by means of the separate voltage management ICs but has a feature that solves factors that cause out of the balance of the remaining capacity amounts of the two battery blocks. The reason is that, in the aforementioned power supply device, the power lines of both the voltage management ICs are connected to the positive-side and negative-side output terminals of the battery equipment that includes the serially-connected positive-side and negative-side battery blocks so that electric power is equally supplied to each voltage management IC from all the battery modules. Since the power supply device can keep the balance of the remaining capacity amounts of the two battery blocks, actual battery charging/discharging capacity is increased. The reason is that both the battery blocks are equally charged or discharged. Therefore, charging capacity is not limited by the battery block with smaller remaining capacity, and discharging capacity is not limited by the battery block with larger remaining capacity. Also, since there are no factors that cause out of the balance of the remaining capacity amounts of the two battery blocks, it is possible to prevent deterioration caused by that the battery blocks are overcharged and over-discharged, and thus to elongate battery life.

In the aforementioned power supply device, in addition to this, since the voltage management ICs have the common ground line, it is not necessary to shift the level of the output signal of each voltage management IC. Therefore, the power supply device can have a feature in that output signals can be processed by signal transmission circuits with the common ground line.

In the power supply device according to the present invention, the positive-side and negative-side voltage management ICs with respect to the reference midpoint can correspond to the voltage detecting circuitry that detects the respective voltage values of the battery modules.

In the power supply device according to the present invention, the positive-side and negative-side voltage management ICs can provide an overcharged state signal when determining the overcharged state of the battery module, and can provide an over-discharged state signal when determining the over-discharged state of the battery module.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
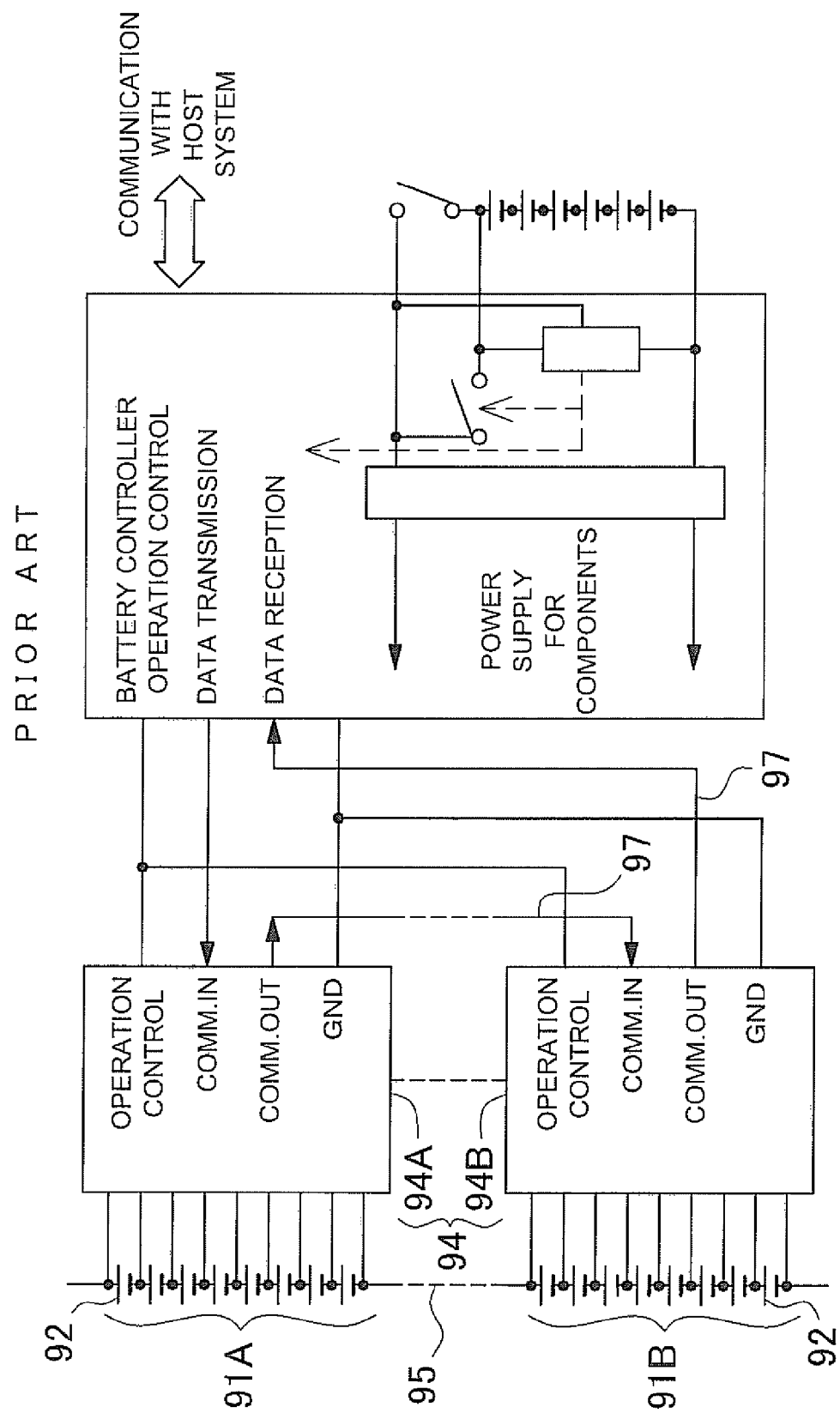
FIG. 1 is a block circuit diagram showing a known power supply device.
Figure 2:
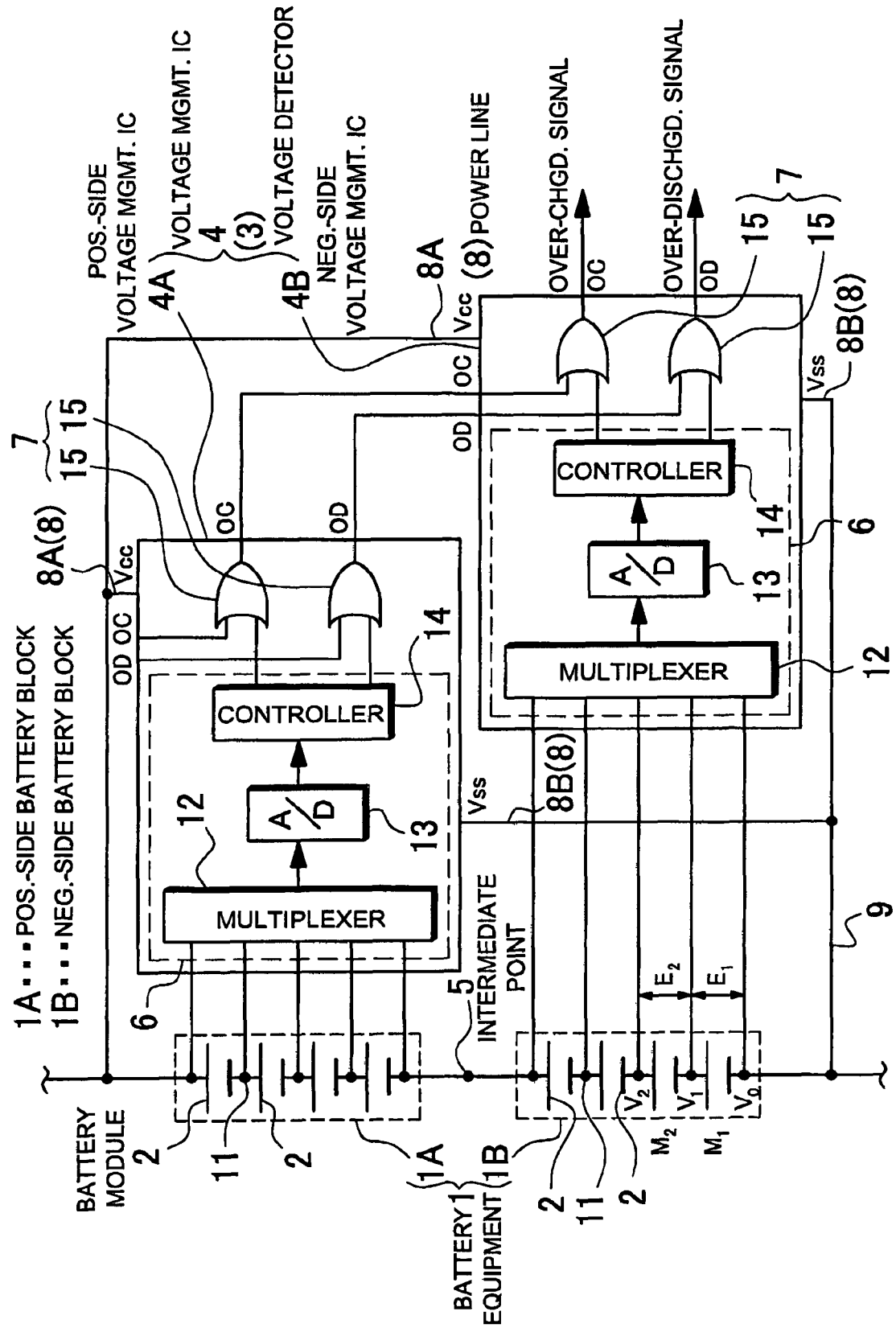
FIG. 2 is a block circuit diagram showing a power supply device according to the present invention.

A power supply device shown in FIG. 2 includes battery equipment 1 and voltage detecting circuitry 3 that detects the respective voltage values of battery modules 2 that compose the battery equipment 1. In the battery equipment 1, two, positive-side and negative-side battery blocks 1A and 1B are serially connected to each other at an intermediate point 5.

The battery equipment 1 includes the positive-side and negative-side battery blocks 1A and 1B that are serially connected to each other. The positive-side battery block 1A is connected on the positive side with respect to the intermediate point 5. The negative-side battery block 1B is connected on the negative side with respect to the intermediate point 5.

In the power supply device shown in FIG. 2, the battery equipment 1 is divided into two blocks of the positive-side and negative-side battery blocks 1A and 1B. In order to separately detect the respective voltage values of the serially-connected battery modules 2, the voltage detecting circuitry 3 includes two voltage management ICs 4 of positive-side and negative-side voltage management ICs 4A and 4B. Each of the voltage management ICs 4 includes a determination circuit 6 that determines the fully-charged and fully-discharged states of the battery modules 2 based on the respective voltage values of the battery modules 2 to be detected, and a signal transmission circuit 7 that is connected to the output side of the determination circuit 6.

Positive-side and negative-side voltage power lines 8A (Vcc) and 8B (Vss) of each of the positive-side and negative side voltage management ICs 4A and 4C are connected to positive-side and negative-side output terminals of the battery equipment 1 so that the battery equipment 1 in which all the battery modules 2 are serially connected to each other supplies electric power to each of the voltage management ICs 4. In the power supply device, each of the voltage management ICs 4 is supplied with electric power from all the battery modules 2. That is, each of the voltage management ICs 4 is not supplied with electric power from the battery modules 2 in one of the battery blocks. Since electric power is thus supplied to each of the voltage management ICs 4 from all the battery modules 2, even if the power consumption amounts of the voltage management ICs 4 are unbalanced, there is no difference of current that flows in the battery modules 2 when the battery modules 2 supply electric power to the voltage management ICs 4.

A common ground line 9 serves as the negative-side power line 8B (Vss) for each of the voltage management ICs 4.

The voltage management ICs 4 detect the respective voltage values of the serially connected battery modules 2 and prevent the battery modules 2 from being fully-charged and fully-discharged. The voltage managements IC 4 detect the respective voltage values of the battery modules 2 based on the voltage values at connection points 11 of the battery modules 2. The voltage management ICs 4 can detect the respective voltage values of all the connecting points 11, and thus can detect the respective voltage values of all the battery modules 2.

The voltage managements IC 4 determine the fully-charged and fully-discharged states of the battery modules 2 based on the respective detected voltage values of the serially-connected battery modules 2. The determination of the fully-charged and fully-discharged states of the battery module 2 is made based on comparison between the respective detected voltage values of the battery module 2 and predetermined voltage values. If the voltage value of the battery module 2 to be discharged becomes lower than the minimum voltage value, the determination is made that the battery module 2 is in an over-discharged state. An over-discharged state signal is provided. If the voltage value of the battery module 2 to be charged becomes higher than the maximum voltage value, the determination is made that the battery module 2 is in an over-charged state. An over-charged state signal is provided.

The voltage management ICs 4 can be used to detect the respective voltage values of the battery modules 2 to determine the fully-charged and fully-discharged states of the battery modules 2 and to correct the remaining capacity amounts of the battery modules 2. Although the remaining capacity amount of the battery module 2 is calculated based on integration of current, the remaining capacity amount of the battery module 2 can be corrected based on the voltage value of the battery module 2.

In the battery equipment 1 that includes two battery blocks that are serially connected to each other, the same amount of charging/discharging current flows through the battery modules 2 in both the positive-side and negative-side battery blocks. Accordingly, the charging current amounts and the discharging current amounts of all the battery modules 2 are equal. However, the electric characteristics of all the battery modules 2 are not always completely equal. In particular, in the case where the number of repetitive charging/discharging cycles increases, the battery modules 2 deteriorate in different extents. For this reason, the capacity amounts of the battery modules 2 that can be fully charged vary in different extents. In this case, the battery module 2 with a reduced capacity amount that can be fully charged becomes likely to be over-charged and over-discharged. Since, if batteries are over-charged or over-discharged, the electrical characteristics of the batteries deteriorate, the battery module 2 with a reduced capacity that can be fully charged will sharply deteriorate if being over-charged or over-discharged. For this reason, in the battery equipment 1 that includes the multiple battery modules 2 that are serially connected to each other, it is important to prevent the battery modules 2 from being over-charged and over-discharged, that is, to protect the battery modules 2 when the battery modules 2 are charged/discharged. In order to protect all the battery modules 2 when the battery modules 2 are charged/discharged, the voltage management ICs 4 detect the respective voltage values of the battery modules 2.

For example, in the case where battery equipment that includes fourteen battery modules that are serially connected, the battery equipment can be divided into two battery blocks so that the positive-side battery block includes seven battery modules, and the negative-side battery block includes seven battery modules. Alternatively, the positive-side battery block can include sixth battery modules, and the negative-side battery block can include eight battery modules. Note that lithium-ion batteries can be used as the battery modules.

The determination circuit 6 of each voltage management IC 4 detects the voltage value of each battery module 2 based on the voltage difference between connection points 11 to which the both ends of the battery module 2 are connected. For example, in FIG. 2, the voltage value E1 of a battery module M1 is obtained by V1-V0, and the voltage value E2 of a battery M2 is obtained V2-V1. Each determination circuit 6 includes a multiplexer 12, an A/D converter 13, and a control circuit 14. The multiplexer 12 is connected on the input side in the determination circuit 6. The A/D converter 13 is connected to the output side of the multiplexer 12. The control circuit 14 calculates the voltage value of each battery module 2 based on a digital voltage signal that is provided from the A/D converter 13. The multiplexer 12 sequentially shifts the connecting points 11, and provides analog voltage signals to the A/D converter 13. The A/D converter 13 converts the analog voltage signals of the connecting points 11 that are sequentially shifted into digital signals, and provides the converted signals to the control circuit 14. The control circuit 14 detects the voltage value of each battery module 2 based on the voltage signals at the connecting points 11 that are sequentially provided, and determines the fully-charged and fully-discharged states of the battery module 2 based on the detected voltage value of the battery module 2. Note that a reference supply and a comparator may be used instead of the multiplexer 12 and the A/D converter 13.

The voltage management IC 4 externally provides the fully-charged and fully-discharged signals from the signal transmission circuit 7. The fully-charged and fully-discharged signals are provided from the determination circuit 6. Each of the signal transmission circuits 7 includes two OR circuits 15. In the signal transmission circuit 7 of the positive-side voltage management IC 4A, one input side of each OR circuit 15 is connected to the output of the determination circuit 6. In the signal transmission circuit 7 of the negative-side voltage management IC 4B, one input side of each OR circuit 15 is connected to the output side of the positive-side voltage management IC 4A, and another input side is connected to the output side of the determination circuit 6 of the negative-side voltage management IC 4B. The positive-side signal transmission circuit 7 provides the fully-discharged signal or the fully-charged signal to the negative-side signal transmission circuit 7. The fully-discharged signal or the fully-charged signal is provided from the determination circuit 6. When provided with the fully-discharged signal or the fully-charged signal from both or one of the positive-side and negative-side determination circuits 6, the negative-side signal transmission circuit 7 provides the fully-discharged signal or the fully-charged signal. If any of the battery modules 2 becomes in the fully-discharged or fully-charged state, the voltage detecting circuitry 3 provides the fully-discharged signal or the fully-charged signal from the negative-side voltage management IC 4B.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2006-243330 filed in Japan on Sep. 7, 2006, the content of which is incorporated herein by reference.

What is claimed is:

1. A power supply device comprising:
   battery equipment that includes a positive-side block and a negative-side battery block, each of which includes a plurality of battery modules that are serially connected to each other, the positive-side and negative-side battery blocks being serially connected to each other at a reference midpoint; and
   voltage detecting circuitry that detects the respective voltage values of each of the plurality of battery modules of said battery equipment,
   wherein said voltage detecting circuitry includes a positive-side voltage management IC and a negative-side voltage management IC, the positive-side and negative-side voltage management ICs managing the voltage conditions of the plurality of battery modules in the positive-side and negative-side battery blocks, respectively,
   wherein positive-side and negative-side voltage power lines of each of the positive-side and negative side voltage management ICs are connected to positive-side and negative-side output terminals of said battery equipment so that all the plurality of battery modules supply electric power to each of the positive-side and negative-side voltage management ICs, and the positive-side and negative-side voltage management ICs have a common ground line,
   wherein each battery module is connected to either the positive-side voltage management IC or the negative-side voltage management IC, and each battery module connected to either the positive-side or the negative-side voltage management IC is capable of supplying electric power to the other negative-side or positive-side voltage management IC.

2. The power supply device according to claim 1, wherein the positive-side and negative-side voltage management ICs with respect to the reference midpoint serve as said voltage detecting circuitry that detects the respective voltage values of the plurality of battery modules.

3. The power supply device according to claim 1, wherein the positive-side and negative-side voltage management ICs with respect to the reference midpoint provide an overcharged state signal when determining the overcharged state of a battery module, and provide an over-discharged state signal when determining the over-discharged state of the battery module.

4. The power supply device according to claim 1, wherein the power supply device is a power supply for power tools.

5. The power supply device according to claim 1, wherein the power supply device is a backup power supply.

6. The power supply device according to claim 1, wherein the positive-side and negative-side voltage management ICs detect the voltage values of the plurality of battery modules to determine the fully-charged and fully-discharged states of the plurality of battery modules, and correct the remaining capacity amounts of the plurality of battery modules.

7. The power supply device according to claim 6, wherein the positive-side and negative-side voltage management ICs integrates the current values of the plurality of battery modules to calculate the remaining capacity amounts of the plurality of battery modules, and corrects the calculated remaining capacity amounts of the plurality of battery modules based on the voltage values of the plurality of battery modules.

8. The power supply device according to claim 1, wherein the plurality of battery modules are lithium-ion rechargeable batteries.

9. The power supply device according to claim 1, wherein each of the positive-side and negative-side voltage management ICs includes a determination circuit that determines the fully-charged and fully-discharged states of a battery module to be detected based on the voltage value of the battery module.

10. The power supply device according to claim 9, wherein the determination circuit of each positive-side and negative-side voltage management IC detects the voltage value of the battery module based on a voltage difference between connection points to which the both ends of the battery module are connected.

11. The power supply device according to claim 1, each of the positive-side and negative-side voltage management ICs includes a determination circuit that determines fully-charged and fully-discharged states of a battery module to be detected based on the voltage value of the battery module, and a signal transmission circuit that is connected to an output side of the determination circuit and transmits over-discharged and overcharged state signals.

12. The power supply device according to claim 11, wherein the signal transmission circuit includes two OR circuits.

13. The power supply device according to claim 12, wherein one input side of each OR circuit of the signal transmission circuit of the positive-side voltage management IC is connected to the output of the determination circuit, and the over-discharged and overcharged state signals that are provided from the determination circuit are provided to a negative-side signal transmission circuit.

14. The power supply device according to claim 12, wherein one input side of each OR circuit of the signal transmission circuit of the negative-side voltage management IC is connected to the output side of the positive-side voltage management IC, and another input side is connected to the output side of the determination circuit of the negative-side voltage management IC so that, when one of or both the positive-side and negative-side determination circuits provide the over-discharged or overcharged state signal, the signal transmission circuit of the negative-side voltage management IC transmits the over-discharged or overcharged state signal.

15. The power supply device according to claim 1, wherein each positive-side and negative-side voltage management IC comprises a multiplexer which detects the voltage value of a battery module based on a voltage difference between connection points to which both ends of the battery module are directly connected.

* * * * *